(12) United States Patent
Hwang et al.

(10) Patent No.: US 6,472,779 B2
(45) Date of Patent: Oct. 29, 2002

(54) COOLING CONTROL SYSTEM OF LINEAR MOTOR

(75) Inventors: Ji Hyun Hwang; Do Hyun Kim, both of Kyoungki-do; Ki Ha Lee, Seoul, all of (KR)

(73) Assignee: Mirae Corporation, Chunan-si (KR)

( * ) Notice: Subject to any disclaimer, the term of this patent is extended or adjusted under 35 U.S.C. 154(b) by 52 days.

(21) Appl. No.: 09/780,493

(22) Filed: Feb. 12, 2001

(65) Prior Publication Data

US 2001/0028200 A1 Oct. 11, 2001

(30) Foreign Application Priority Data

Apr. 7, 2000 (KR) .............................. 00-18124
Apr. 7, 2000 (KR) .............................. 00-18125

(51) Int. Cl.⁷ .......................... H02K 41/00; H02K 9/00
(52) U.S. Cl. ......................................... 310/12; 318/135
(58) Field of Search ............................... 310/12, 13, 14; 318/135

(56) References Cited

U.S. PATENT DOCUMENTS

| | | | |
|---|---|---|---|
| 4,520,300 A | * 5/1985 | Fradella | 318/603 |
| 5,703,420 A | 12/1997 | Kamata et al. | 310/54 |
| 5,783,877 A | 7/1998 | Chitayat | 310/12 |
| 6,114,781 A | * 9/2000 | Hazelton et al. | 310/12 |
| 6,359,359 B1 | * 3/2002 | Miura et al. | 310/156.43 |

* cited by examiner

Primary Examiner—Nestor Ramirez
Assistant Examiner—Judson H. Jones
(74) Attorney, Agent, or Firm—Fleshner & Kim, LLP

(57) ABSTRACT

An apparatus for controlling cooling of a linear motor includes: a stator having a first temperature sensor, a heat sink and at least one cooling fan installed at a predetermined portion thereof; a mover having a second temperature sensor and a heat sink installed at the upper surface thereof; an encoder for sensing a position of the mover and generating a position signal; an A/D converter for receiving and converting signals from the first and the second temperature sensors and outputting a first and a second temperature sensing signals; a controller for generating a plurality of cooling fan control signals and an air valve control signal to cool the heat generated from the stator and the mover; a D/A converter for converting the plurality of cooling fan control signals and the air valve control signal and transmitting a plurality of drive signals to the plurality of cooling fans and to the air valve; and a mover driver for providing a drive signal to a coil block.

7 Claims, 4 Drawing Sheets

COOLING CONTROL SYSTEM OF LINEAR MOTOR

BACKGROUND OF THE INVENTION

1. Field of the Invention

The present invention relates to an apparatus and method for controlling cooling of a linear motor, and more particularly to an apparatus and method for controlling cooling of a linear motor in which as a heat generated from linear motor is sensed, the linear motor is cooled by using a cooling fan or an air nozzle by sensing heat generated from the linear motor.

2. Description of the Background Art

Generally, as shown in FIG. 1, a linear motor includes a stator 10 and a mover 20. Referring to the stator 10, a plurality of permanent magnets 12 are installed at predetermined intervals at both inner sides of a 'U'-type frame 11. The mover 20 includes a coil block 22 at the lower portion of a flat-type frame 21. The coil block 22 is formed in a manner that a plurality of coils 22a are arranged at predetermined intervals and molded.

As a driving power (not shown) is supplied to the coil block 22, current flows to the coil block 22, so that a magnetic field is generated between the plurality of permanent magnets 12 disposed at the inner side of the stator 10 and the coil block 22, according to which thrust is generated to move the mover 20.

In case where the driving power is supplied for a long time, the coil 22a is overloaded, so that much heat is generated. In this case, the flat type frame 21 of the mover 20 is thermally deformed, or the heat generated from the coil is conducted to the 'U'-type frame 11 of the stator 10, causing a thermal deformation of the stator 10.

In the case that the stator or the mover is thermally deformed, a linear motor adopted for use to a high speed and precision mechanic field would be malfunctioned. In case that the linear motor makes an error, various kinds of machines adopting such a defective linear motor would be damaged critically.

SUMMARY OF THE INVENTION

Therefore, an object of the present invention is to provide an apparatus and method for controlling cooling of a linear motor in which, upon sensing a temperature corresponding to a heat generated from a linear motor, in case that the sensed temperature is higher than a pre-set reference temperature, a cooling fan installed at a stator and an air valve for opening and closing air to be supplied to the mover are controlled to cool the linear motor.

Another object of the present invention is to provide an apparatus and method for controlling cooling of a linear motor in which, upon comparing a temperature sensed in a linear motor with a pre-set reference temperature, in case that the sensed temperature is lower than the pre-set reference temperature, a cooling fan for cooling the linear motor or air is cut off.

To achieve these and other advantages and in accordance with the purpose of the present invention, as embodied and broadly described herein, there is provided an apparatus for controlling cooling of a linear motor including: a stator having a first temperature sensor, a heat sink and at least one cooling fan installed at a predetermined portion thereof; a mover having a second temperature sensor and a heat sink installed at the upper surface thereof; an encoder for sensing a position of the mover and generating a position signal; an A/D converter for receiving and converting signals from the first and the second temperature sensors and outputting a first and a second temperature sensing signals; a controller for generating a plurality of cooling fan control signals and an air valve control signal to cool the heat generated from the stator and the mover; a D/A converter for converting the plurality of cooling fan control signals and the air valve control signal and transmitting a plurality of drive signals to the plurality of cooling fans and to the air valve; and a mover driver for providing a drive signal to a coil block.

To achieve the above objects, there is also provided a method for controlling cooling of a linear motor including the steps of: operating a mover in a predetermined direction (S11); measuring temperatures (Ts, Tm) of a stator and the mover by using a first and a second temperature sensors respectively installed at the stator and the mover (S12); comparing the temperature values (Ts, Tm) with a pre-set reference temperature (a comparative value) (S13); computing a temperature value difference in case that the temperature values (Ts, Tm) are greater than the comparative value (S14); computing the computed temperature as a temperature gain (S15); and controlling a first and a second cooling fans and an air valve 33 according to the temperature gain by the controller.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The cooling controlling apparatus and method of a linear motor of the present invention will now be described.

Figure 1:
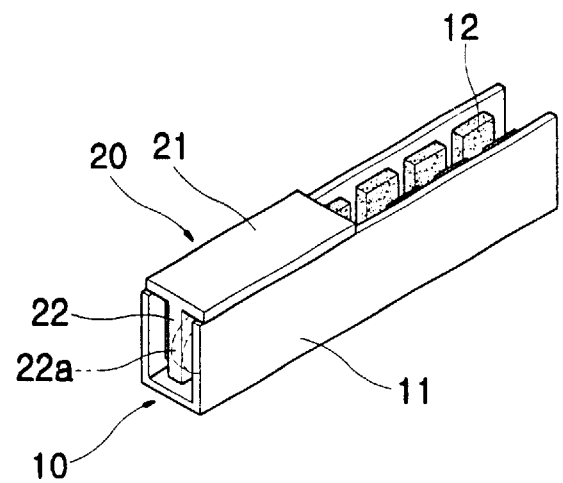
FIG. 1 is a schematic perspective view of a linear motor in accordance with a conventional art.
Figure 2:
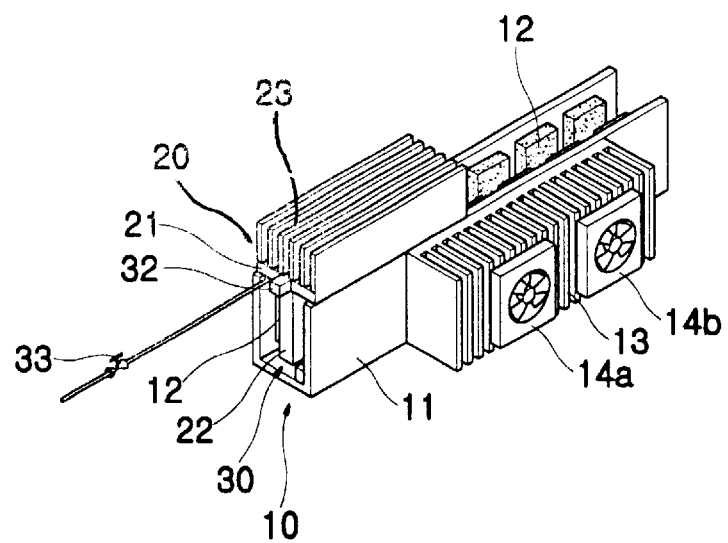
FIG. 2 is a perspective view of a linear motor adopting a cooling controlling apparatus of a linear motor in accordance with the present invention.
Figure 3:
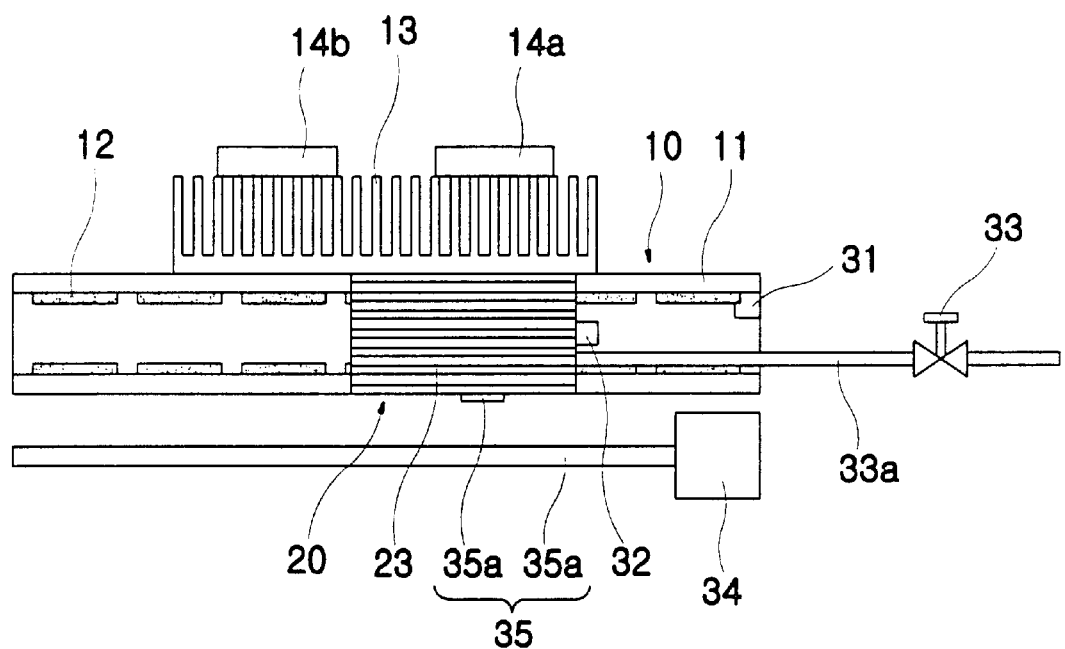
FIG. 3 is a plan view of the linear motor of FIG. 2 in accordance with the present invention.
Figure 4:
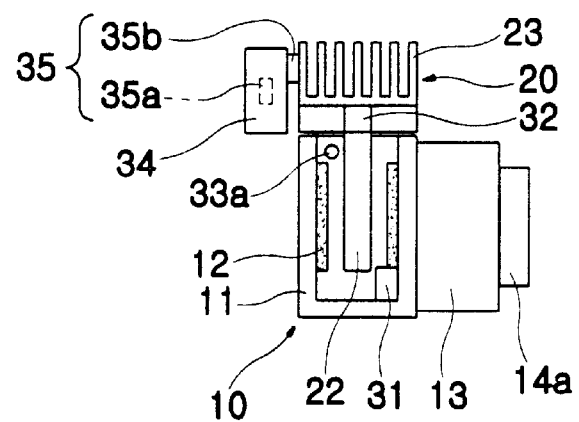
FIG. 4 is a side view of the linear motor of FIG. 2 in accordance with the present invention.

FIG. 2 is a perspective view of a linear motor adopting a cooling controlling apparatus of a linear motor in accordance with the present invention, FIG. 3 is a plan view of the linear motor of FIG. 2 in accordance with the present invention, and FIG. 4 is a side view of the linear motor of FIG. 2 in accordance with the present invention.

As shown in the drawings, a cooling controlling apparatus of a linear motor of the present invention is constructed that a heat sink 13 is installed at an outer predetermined portion of a 'U'-type frame 11 of a stator 10, and a first temperature sensor 31 is installed at an inner predetermined portion of the 'U'-type frame 11. And, a heat sink 23 is installed at the upper portion of a flat type frame 21 of a mover 20, and a second temperature 32 is installed at one side thereof.

The first temperature sensor 31 senses a temperature of a stator 10 and generates a temperature signal, while the second temperature sensor 32 sense a temperature of the mover 20 and generates a temperature signal.

At outer side of the heat sink, at least one cooling fan 14 is installed. In this respect, two cooling fans of a first and a second cooling fans 14a and 14b are provided in the present invention.

An air nozzle 33a which is opened and closed by an air valve 33 is positioned at an upper side of the mover 20, so as to provide an air to cool the mover 20 when the mover 20 is overheated.

As shown in FIGS. 3 and 4, an encoder 35 for sensing the position and the speed of the mover 20 is installed. The encoder 35 is a linear encoder which includes an indication member 35a and an optical sensor 35b installed at one side of the mover 20. An encoder periphery sensing unit 34 is installed at one side of the indication member 35a, to measure a peripheral environment of the encoder 35 and generate a peripheral environment signal, that is, an analog signal. That is, the encoder periphery sensing unit 34 includes sensors for measuring a humidity, a temperature and a pressure of the periphery of the encoder 35.

Figure 5:
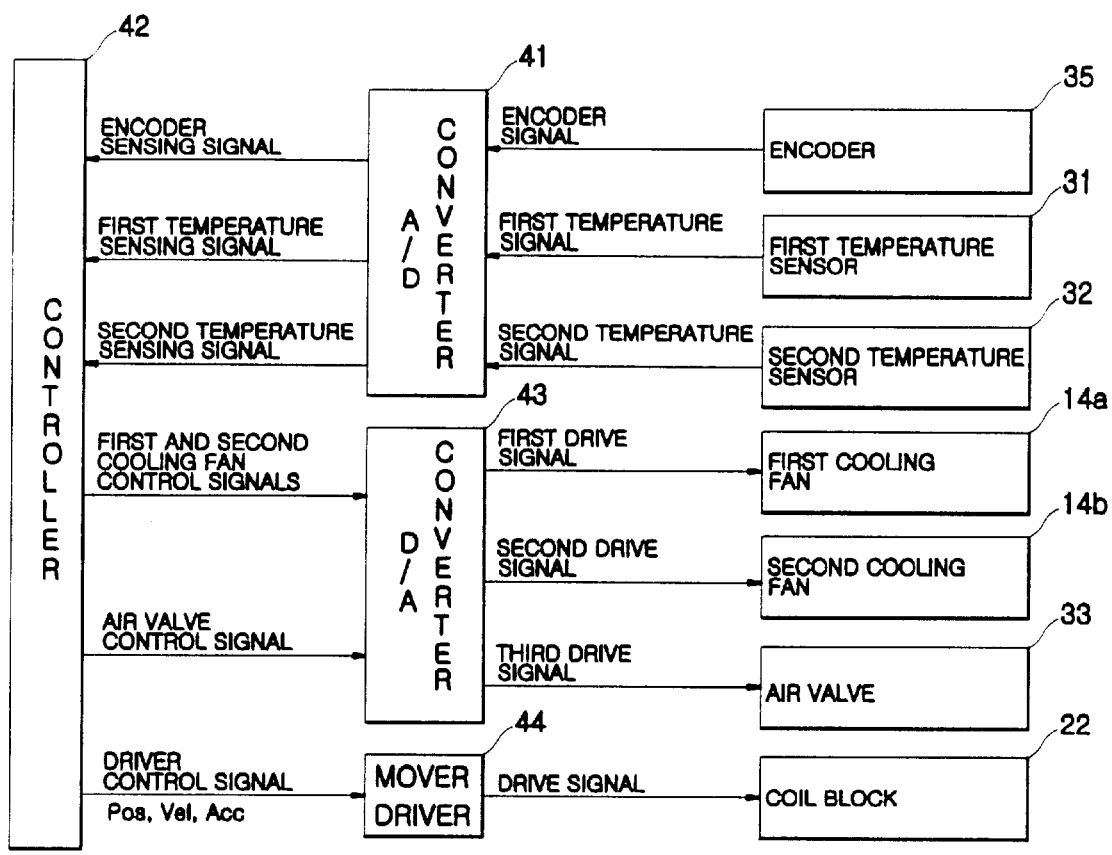
FIG. 5 is a schematic block diagram of a controlling unit of a cooling apparatus of FIG. 2 in accordance with the present invention.
Figure 6:
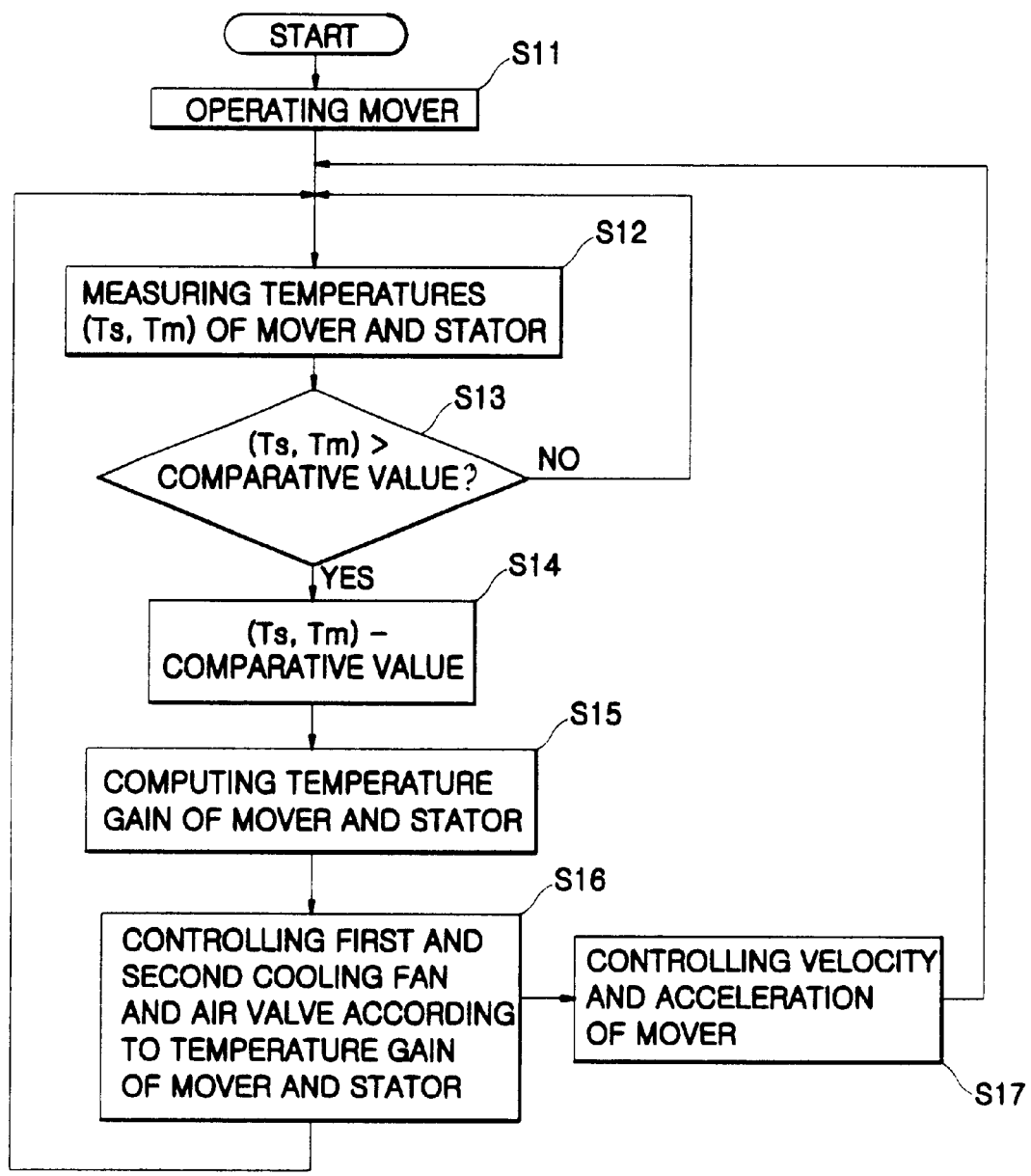
FIG. 6 is a flow chart of a cooling controlling method of a linear motor in accordance with the present invention.

Meanwhile, in order to linearly move the mover 20 in a predetermined direction, as shown in FIG. 5, a controller 42 generates a driver control signal, such as a position control signal (POS), a velocity control signal (VEL) or an accelerator control signal (ACC), and outputs it to a mover driver 44. The mover driver 44 receives the driver control signal such as the position control signal (POS), the velocity control signal (VEL) or the accelerator control signal (ACC) from the controller 42 and generates a drive signal and outputs it to a coil block 22.

The mover driver 44 generates a drive signal to transmit it to the coil block 22 of the mover 20 according to the driver control signal such as the position control signal (PDS), the velocity control signal (VEL) or the accelerator control signal (ACC).

According to the received drive signal, current flows to the coil block 22, according to which a magnetic field is generated between a plurality of permanent magnets 12 and the coil block 22 installed at the stator 10, and owing to the magnetic field, a driving force is generated to thrust the mover 20. Thus, the mover 20 is linearly moved by virtue of the thrust.

In case that a driving power is supplied to the coil block 22 for a long time, the coil block 22 is heated. The heat generated at the coil block 22 is conducted to the flat type frame 21 of the mover 20.

At this time, the heat is cooled by the heat sink 13 and 23 respectively installed at the stator 10 and the mover 20, the first and the second cooling fans 14a and 14b and the air nozzle 33a.

The first and the second cooling fans 14a and 14b installed at both side surfaces of the heat sink serve to quicken to discharge heat in case that heat is slowly discharged through the heat sink.

Meanwhile, unlike the stator 10 which discharges heat by using the heat sink 13, the first cooling fan 14a and the second cooling fan 14b, the mover 20 discharges outwardly heat conducted from the coil block 22 through the heat sink installed at the upper surface thereof. At this time, air is used in order to discharge quickly heat generated from the coil block 22. Air is supplied from an external source and the air valve 33 opens and closes the air. When the air valve 33 is opened, air is sprayed through the air nozzle 33a to the coil block 22, so that heat generated from the coil block 22 is forcefully cooled.

As shown in FIGS. 3 and 5, the encoder 35 senses the velocity and position of the mover 20 and generates an encoder signal. The generated encoder signal is converted to a digital signal, that is, an encoder sensing signal, by an A/D converter 41, which is then received by the controller 42.

The controller 42 discriminates the position and the velocity of the mover 20 by using the encoder sensing signal as received.

In case that the velocity of the mover 20 is faster than a predetermined velocity, or in case that heat is generated between the coil block 22 of the mover 20 and the permanent magnet 12 of the stator 10 due to overload, the controller 42 generates a first and a second cooling fan control signals and an air valve control signal, converts them into an analog signal in the D/A converter 43 and controls the first cooling fan 14a, the second cooling fan 14b and the air valve 33, to operate them.

Meanwhile, a method for controlling cooling of a linear motor of the present invention includes the steps of: operating the mover 20 in a predetermined direction (S11), measuring a temperature Ts of the stator 10 and a temperature Tm of the mover 20 by using the first and the second temperature sensors 31 and 32 respectively installed at the stator 10 and the mover 10 (S12); comparing the temperatures Ts and Tm with a pre-set reference temperature (a comparative value) (S13); computing a temperature difference in case that the temperatures Ts and Tm are greater than the pre-set comparative value (S14); computing the computed temperature as a temperature gain (S15); and controlling the first and the second cooling fans 14a and 14b and the air valve 33 to be corresponded to the temperature gain by means of the controller 42 (S16).

In the step S12 for measuring the temperatures Ts and Tm of the stator 10 and the mover 20, the first and the second temperature sensors 31 and 32 respectively sense heat generated from the stator 10 and the mover 20, generate a first and a second temperature signals, that is, analog signals, and output them.

The first and the second temperature signals are converted to digital signals by the A/D converter 41 and inputted to the controller as a first and a second temperature sensing signals.

In the step S13 for comparing the temperatures Ts and Tm and the pre-set reference temperature (the comparative value), the controller 42 stores the temperatures Ts and Tm and then compares the temperatures with the pre-set comparative value.

In the step S16 for controlling the first and the second cooling fans 14a and 14b and the air valve 33 by the controller 42, the controller 42 generates a first and a second cooling fan control signals and an air valve control signal, which are converted into a first to the third drive signals, that is, into analog signals, by the D/A converter 43, according to which the first and the second cooling fans 14a and 14b and the air valve 33 are driven as much as the temperature gain, thereby cooling the linear motor.

In the step S16 for controlling the first and the second cooling fans 14a and 14b and the air valve 33 by the controller 42, in case that the heat generated from the stator and the mover are not reduced, a step S17 for controlling a velocity and an acceleration of the mover 20 is further included. That is, the controller 42 reduces the speed and the acceleration of the mover 20 to drive the mover 20 at a low speed for a predetermined time, cooling up to the pre-set temperature.

To sum up, the first and the second cooling fans and the air valve are controlled depending on the degree of the heat generated from the stator and the mover to cool the linear motor, so that the cooling efficiency can be improved. IN addition, the velocity and the acceleration of the mover are controlled, so that performance degradation of the linear motor due to the heat and thermal deformation of the stator and the mover can be prevented.

As so far described, according to the apparatus and method for controlling cooling of a linear motor of the present invention, temperatures of the stator and the mover are sensed and compared with a pre-set reference temperature, and in case that the temperatures of the stator and the mover are higher than the pre-set reference temperature, the first and the second cooling fans and the air valve are controlled to cool the stator and the mover, so that the stator and the mover can be maintained at a certain temperature. In addition, performance degradation of the linear motor due to heat and a thermal deformation of the stator and the mover can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for controlling cooling of a linear motor having a stator and a mover, comprising:

a stator having a first temperature sensor, a heat sink and at least one cooling fan installed at a predetermined portion thereof;

a mover having a second temperature sensor and a heat sink installed at the upper surface thereof;

an encoder for sensing a position of the mover and generating a position signal;

an A/D converter for receiving signals from the first and the second temperature sensors, converting and outputting the signals as a first and a second temperature sensing signals;

a controller for generating a plurality of cooling fan control signals and an air valve control signal to cool the heat generated from the stator and the mover;

a D/A converter for converting the plurality of cooling fan control signals and the air valve control signal and transmitting a plurality of drive signals to the plurality of cooling fans and to the air valve; and a mover driver for providing a drive signal to a coil block.

2. The apparatus according to claim 1, wherein the encoder includes an indication member for indicating position information of the mover, and an optical sensor for reading the position information of the mover indicated in the indication member.

3. The apparatus according to claim 1, wherein the encoder is a linear encoder.

4. The apparatus according to claim 1, wherein an encoder periphery sensing part including sensors for measuring peripheral environment (humidity, temperature and pressure) is installed at one side of the encoder.

5. The apparatus according to claim 1, wherein an air nozzle connected with the air valve for cooling the mover is installed at one side of the mover at a predetermined distance.

6. A method for controlling cooling of a linear motor comprising the steps of:

operating a mover in a predetermined direction;

measuring temperatures (Ts, Tm) of a stator and the mover by using a first and a second temperature sensors respectively installed at the stator and the mover;

comparing the temperature values (Ts, Tm) with a pre-set reference temperature value (a comparative value);

computing a temperature difference in case that the temperature values (Ts, Tm) are greater than the comparative value;

computing the computed temperature as a temperature gain; and controlling a first and a second cooling fans and an air valve according to the temperature gain by the controller.

7. The method according to claim 6, further comprising a step for controlling a velocity and an acceleration of the mover, in case that the heat generated from the stator and the mover are not reduced in the step for controlling the first and the second cooling fans and the air valve by the controller.

* * * * *